United States Patent
Dash et al.

(10) Patent No.: US 9,758,414 B2
(45) Date of Patent: Sep. 12, 2017

(54) METHOD FOR RAPID TREATMENT OF WASTE WATER AND A COMPOSITION THEREOF

(75) Inventors: Swati Sucharita Dash, Orissa (IN); Ramachandrappa Subramani, Karnataka (IN); Dhinakar Sathyanathan Kompala, Superior, CO (US)

(73) Assignee: RICHCORE LIFESCIENCES PVT. LTD., Bangalore Urban District, Karnataka (IN)

( * ) Notice: Subject to any disclaimer, the term of this patent is extended or adjusted under 35 U.S.C. 154(b) by 233 days.

(21) Appl. No.: 13/806,078

(22) PCT Filed: Jun. 21, 2011

(86) PCT No.: PCT/IN2011/000418
§ 371 (c)(1),
(2), (4) Date: Dec. 20, 2012

(87) PCT Pub. No.: WO2011/161695
PCT Pub. Date: Dec. 29, 2011

(65) Prior Publication Data
US 2013/0098837 A1    Apr. 25, 2013

(30) Foreign Application Priority Data
Jun. 24, 2010 (IN) .......................... 1778/CHE/2010

(51) Int. Cl.
C02F 3/00    (2006.01)
C02F 3/34    (2006.01)
(Continued)

(52) U.S. Cl.
CPC .............. *C02F 3/341* (2013.01); *C02F 3/34* (2013.01); *C02F 3/342* (2013.01); *C02F 1/722* (2013.01);
(Continued)

(58) Field of Classification Search
CPC .. C02F 3/34; C02F 3/342; C02F 1/722; C02F 1/5245; C12P 1/04; C12R 1/01; C12N 1/20
(Continued)

(56) References Cited

U.S. PATENT DOCUMENTS 5,275,732 A * 1/1994 Wang et al. ................... 210/601
5,585,272 A * 12/1996 Pierce et al. ............... 435/262.5
(Continued)

FOREIGN PATENT DOCUMENTS

| EP | 0962492 | 12/1999 |
| WO | 91/13036 | 9/1991 |
| WO | 00/07944 | 2/2000 |

OTHER PUBLICATIONS

International Search Report for PCT/IN2011/000418, dated Dec. 21, 2011.

*Primary Examiner* — Claire Norris
(74) *Attorney, Agent, or Firm* — Cooley LLP (57) ABSTRACT

The present invention discloses a process and a composition for the treatment of wastewater. The composition comprises of microbes, enzymes and cofactors along with the nutrients. The composition is a synergistic composition and wastewater can be treated effectively for the removal of pollutants by using the synergistic composition.

8 Claims, 3 Drawing Sheets

(51) Int. Cl.
*C02F 101/30* (2006.01)
*C02F 101/34* (2006.01)
*C02F 103/28* (2006.01)
*C02F 103/30* (2006.01)
*C02F 103/32* (2006.01)
*C02F 103/34* (2006.01)
*C02F 103/36* (2006.01)
*C02F 1/72* (2006.01)
*C02F 101/32* (2006.01)

(52) U.S. Cl.
CPC .. *C02F 2101/308* (2013.01); *C02F 2101/322* (2013.01); *C02F 2101/345* (2013.01); *C02F 2103/28* (2013.01); *C02F 2103/30* (2013.01); *C02F 2103/32* (2013.01); *C02F 2103/343* (2013.01); *C02F 2103/365* (2013.01); *C02F 2305/06* (2013.01)

(58) Field of Classification Search
USPC .......................................... 210/606, 610, 611
See application file for complete search history.

(56) References Cited

U.S. PATENT DOCUMENTS

| | | | |
|---|---|---|---|
| 5,610,065 A * | 3/1997 | Kelley | B09C 1/08 435/262 |
| 5,705,072 A * | 1/1998 | Haase | C02F 3/345 210/605 |
| 5,840,182 A * | 11/1998 | Lucido et al. | 210/202 |
| 5,893,975 A * | 4/1999 | Eifert | 210/602 |
| 7,165,561 B2 * | 1/2007 | Baldridge et al. | 134/22.14 |
| 7,267,772 B2 * | 9/2007 | Kumar et al. | 210/601 |
| 7,285,217 B2 | 10/2007 | Simpson et al. | |
| 7,585,132 B2 * | 9/2009 | Imbrie | 405/128.75 |
| 8,298,416 B2 * | 10/2012 | Park et al. | 210/205 |
| 2002/0179525 A1* | 12/2002 | Shaffer et al. | 210/610 |
| 2004/0009095 A1* | 1/2004 | Giletto et al. | 422/28 |
| 2005/0011830 A1* | 1/2005 | Lessard | 210/610 |
| 2005/0067347 A1* | 3/2005 | Vanhulle | C02F 1/78 210/606 |
| 2008/0156723 A1* | 7/2008 | Kumar et al. | 210/601 |

* cited by examiner

METHOD FOR RAPID TREATMENT OF WASTE WATER AND A COMPOSITION THEREOF

FIELD OF THE INVENTION

The present invention relates to a synergistic composition of microbes, enzymes and cofactors for rapid treatment of wastewater and to a process for the removal of pollutants in wastewater.

DESCRIPTION OF THE BACKGROUND ART

Bioremediation is any process that uses microorganisms, fungi, green plants or their enzymes, for treating contamination of the natural environment, caused by wastewater. More particularly, bioremediation uses living systems especially microorganisms to catalyze the degradation of recalcitrant chemicals without disruption of the environment. The main chemical constituents in wastewater released from industrial sectors such as textiles, paper and pulp, oil refineries, pharmaceuticals and food processing units, include but are not limited to dyes, azo dye, reactive dye or a combination therein, aromatic compounds, phenolics, nitrobenzenes. Further, the wastewater also includes organic debris such as cellulosic and hemicellulosic material from fibers, bleaching reagents and other organic solvents. These contribute to colour, chemical oxygen demand (COD), odour, total dissolved solids and other polluting parameters in the discharged water.

Bioremediation can be achieved ex situ or in situ on the basis of removal and transportation of wastes for treatment. In situ bioremediation includes technologies such as bioventing, enhanced biodegradation and phyto-remediation. Some of the advantages of in situ bioremediation methods include minimal site disruption, simultaneous treatment of contaminated soil or water, minimal exposure of public and site personnel, and low costs.

Bioremediation techniques in situ include introduction of different strains of live micro organisms to wastewater at various stages of treatment of the same. Preferably, methods known to exist in the prior art have targeted the sludge formed. The sludge is treated once at the preliminary stage of formation and subsequently after secondary treatment of the wastewater, when activated sludge is obtained. Most of the methods known introduce microbes/bacterial strains in the log phase of growth of the culture. These actively growing microbes consume waste and oxygen for their multiplication and need to be activated at regular intervals leading to increase in the time required for degradation.

Hence, there is a need for reducing the time for degradation and one such method for reducing the time required for degradation is disclosed in US application No 2006/0086659 by Kemira. The method includes the steps of providing an enzyme mixture capable of digesting natural polymeric materials, adding the enzyme mixture to an aqueous sludge suspension, and thereafter, adding at least one species of fermenting bacteria to the suspension, thereby fermenting the resulting suspension.

The addition of enzymes enables digestion of polymeric materials and the microbes added facilitate in fermenting the sludge suspension thereby reducing the time taken for treatment. However, the application is mainly for a sludge suspension and deals with degradation of only natural polymeric materials. Generally, rapid treatment of wastewater is desired even before the stage of formation of sludge. Hence, there is a need for a method that is capable of treating the wastewater rapidly and at any stage of treatment. Also, there is a need for a method for treatment of wastewater that is universally applicable for various kinds of pollutants present in wastewater.

U.S. Pat. No. 4,478,683 describes a method of killing and inhibiting the growth of microorganisms in industrial process streams. The method comprises the addition of an enzymatically catalyzed biocide system utilizing a microbial or plant dehydrogenase enzyme such as peroxidase or laccase in the presence of an oxidant such as hydrogen peroxide or oxygen to oxidize phenolic compounds found in or added to the process streams to produce oxidation products that are toxic to microorganisms.

U.S. Pat. No. 7,285,217 claims a synergistic composition for controlling odour from waste products. The composition comprises a combination of nitrate salt, sulfide-consuming compound, pH-elevating compound, sulfide-oxidizing, nitrate-reducing bacteria, and sulfide-oxidizing enzyme. The method includes adding a sufficient amount of the composition to a waste stream to provide sufficient sulfide-consuming compound to effect immediate removal of sulfide. The composition incorporates a pH elevating compound, which both decreases the amount of gaseous $H_2S$ and puts the aqueous phase into a pH range where naturally occurring bacteria can more easily metabolize the sulfide. The composition also includes one or more nitrate salts which will accomplish longer term prevention of odours; Specific bacteria are incorporated into the formulation to insure that the nitrate has the right type and amount of bacteria present to prevent formation of and/or consume sulfide. Specific enzymes are incorporated into the formulation to promote oxidation of sulfide.

SUMMARY OF THE INVENTION

It is an object of the present invention to provide a method or a process for rapid treatment of wastewater that effectively removes environmentally polluting natural and/or synthetic compounds in a short duration of time.

It is another object of the invention to provide a synergistic composition comprising of microbes, enzymes and cofactors that is employed for rapid removal of pollutants from the wastewater.

The invention relates to a composition for the treatment of wastewater to remove the pollutants. The composition comprises of microbes, enzymes and cofactors. Additionally, nutrients are added to the composition. The cofactors include oxidizing agents and inorganic salts of metal ions. The microbes which are further disclosed in the invention can be used either alone or in combination with each other. The enzymes too can be used either alone or in combination with each other. The composition for the removal of pollutants from the wastewater is a synergistic composition due to which the treatment of wastewater for removal of pollutants is very effective and reduces the total time that is required for such processes.

The invention also relates to a process for the treatment of wastewater to remove the pollutants from it. The process comprises of adding a combination of microbes, enzymes and cofactors to the wastewater. The combination is reacted with the wastewater for a predetermined duration of time. Additionally, nutrients can be added to the said combination. The last step of the process involves quantifying the reaction to determine the extent of purification of wastewater.

DETAILED DESCRIPTION OF THE INVENTION

An embodiment of the present invention relates to a composition for the treatment of wastewater to remove the pollutants. The composition is a synergistic composition and comprises of microbes, enzymes and cofactors. Additionally, the composition comprises of nutrients. The microbes present in the composition are selected from *Pseudomonas aeruginosa, Pseudomonas fluorescence, Pseudomonas putida, Pseudomonas desmolyticum, Coriolus versicolour, Lactobacillus* sp. *Bacillus subtilis, Bacillus cereus, Staphylococcus* sp., *Phanerochaete chrysosporium* alone or in combination. Preferably all the microbes are present in the composition. The enzymes are selected from peroxidase (manganese dependent and manganese independent), lignin peroxidase, laccase, catalase, cytochrome c oxidase, glucose oxidase, phenol oxidase, n- and o-demethylase, protease, lipase, alpha-amylase and bacteriocin alone or in combination. Preferably all the enzymes are present in the composition. The cofactors comprises of oxidizing agent and inorganic salts of metals. The oxidizing agent is hydrogen peroxide, which is introduced directly or is obtained from its precursors such as perborate or percarbonate or is obtained from an enzyme that converts molecular oxygen and an organic or inorganic substrate into hydrogen peroxide. The inorganic salts of the metal ions are ferrous sulphate heptahydrate and ferric chloride. The nutrients comprise of yeast extract, peptic digest of animal tissue, di-ammonium phosphate sodium chloride, tryptone, soya extract, enzymatic digest of gelatin, magnesium Sulphate, calcium chloride, magnesium chloride and potassium sulphate.

The amount of the enzymes present in the composition are 10%-20% v/v of peroxidase (manganese dependent and manganese independent), 7%-10% v/v of lignin peroxidase, 7%-10% v/v of laccase, 1%-5% v/v of catalase, 0.5%-3% v/v of cytochrome c oxidase, 5%-10% v/v of glucose oxidase, 3%-5% v/v of phenol oxidase, 1%-2% v/v of n- and o-demethylase, 5%-7% v/v of protease, 5%-7% v/v of lipase, 5% v/v of alpha-amylase and 1% v/v of bacteriocin.

The cofactors are present in the range of 5%-30% each of hydrogen peroxide, ferrous sulphate heptahydrate (Feso4.7H20) and ferric chloride.

The amount of the nutrient present in the composition is 0.2%-0.5% of yeast extract, 0.3%-0.6% peptic digest of animal tissue, 0.05%-0.2% of di-ammonium phosphate and 0.3%-0.8% of sodium chloride, 0.3%-0.6% of tryptone, 0.2%-0.5% of soya extract, 0.2%-0.5% of enzymatic digest of gelatin, 0.3%-0.8% of magnesium sulphate, 0.3%-0.8% of calcium chloride, 0.3%-0.8% of magnesium chloride and 0.3%-0.8% of potassium sulphate.

The composition exhibits synergy and effectively removes the pollutants from the wastewater. Enzymes dissociate the pollutant molecules to simpler form and microbes utilize these simple intermediates in their metabolic activities thereby completely degrading the pollutants in the wastewater. Microbes grow faster due to the increasing availability of simple intermediates and produce more enzymes which can further degrade the pollutants. The cofactors comprising of oxidizing agent and inorganic salts of metal ions are necessary for enzyme catalysis facilitating in the bond dissociation of the pollutant molecule, which is of importance as sooner the bond dissociation, sooner is the degradation of the pollutants. Ferrous sulphate heptahydrate and ferric chloride are added to the composition to provide a mixture of $Fe^{+2}$ and $Fe^{+3}$ ions. In the presence of $Fe^{+2}$, the enzymes have a more enhanced capacity to catalyze the bond dissociation of the pollutant molecules. $Fe^{+2}$ also aid in the metabolism of microbial cells. In the absence of $Fe^{+2}$, the degradation of pollutants in effluent or wastewater is compromised. Hydrogen peroxide releases molecular oxygen that facilitates enzyme catalysis. Hydrogen peroxide also reacts with $Fe^{+2}$ and reduces color by this reaction. Nutrients directly enhance the growth and sustenance of microbes in the effluent, which are responsible for utilizing the simpler molecules in their metabolic activities thereby aiding in the complete degradation of the pollutants in the wastewater. Without the nutrients, growth of the microbes is compromised which in turn affects their ability to degrade pollutants. As can be understood, the enzymes, microbes, cofactors and nutrients are interdependent and work closely with each other to facilitate the easy degradation of the pollutant molecules. The continuous supply of the composition to the wastewater results in the removal of the pollutants in a short duration of time.

According to another embodiment of the invention a process for the treatment of wastewater for removing the pollutants from the wastewater comprises adding a composition or combination of microbes, enzymes and cofactors to the wastewater to be treated. The combination is allowed to react with the wastewater. The reaction is allowed to take place for duration of 2 hours-48 hours. After the treatment of the wastewater with the said composition, the reaction is quantified to determine the extent of purification of the wastewater. Nutrients are also added along with the combination of microbes, enzymes and cofactors to the wastewater. The step of addition of the combination includes adding the said composition continuously through the inlet of the already existing aeration tank of an wastewater treatment plant. When adding the combination, the pH of the wastewater is maintained at 6.5-7.5 by addition of suitable acid or base as necessary. The temperature of the aeration tank is maintained in the range of 25° C. to 40° C. The step of addition of microbes, enzymes and cofactors can be integrated into one or more steps in an existing wastewater treatment plant to reduce level of pollutants in discharged waste water.

During addition, the flow rate of the composition is adjusted in accordance with the flow rate of the wastewater. The flow rate of the composition is adjusted through dosing pumps set for continuous delivery of required amount of composition based on the flow rate of wastewater. The dosage of the said composition to the wastewater is totally independent of the amount of microbes present in the described combination obtained or that already present in the wastewater which needs to be treated. The process brings rapid degradation of wastewater due to presence of live logarithmic phase microbes, exogenous supply of enzymes and cofactors, which enhance enzyme efficiency.

Quantification of the extent of purification of wastewater after treatment with the composition is achieved by estimation of parameters which include but are not limited to Chemical Oxygen Demand (COD), color, total dissolved solids (TDS), Total suspended solids (TSS) and odour. Quantification is done initially at the inlet of a desired stage at which the measurement is required and is prior to the treatment of the sample with the composition. The quantification is again done at the outlet of the desired stage after a predetermined duration of reaction time to determine the extent of purification. The measurement is expressed as percentage decrease of parameters and is calculated from the difference in values of parameters before and after the treatment. The process enhances the final recovery of reusable water by facilitating decolorization and reducing chemical oxygen demand and TDS.

The microbes present in the composition are selected from *Pseudomonas aeruginosa, Pseudomonas fluorescence, Pseudomonas putida, Pseudomonas desmolyticum, Coriolus versicolour, Lactobacillus* sp. *Bacillus subtilis, Bacillus cereus, Staphylococcus* sp., *Phanerochaete chrysosporium* alone or in combination. Preferably all the microbes are present in the composition. The enzymes are selected from peroxidase (manganese dependent and manganese independent), lignin peroxidase, laccase, catalase, cytochrome c oxidase, glucose oxidase, phenol oxidase, n- and o-demethylase, protease, lipase, alpha-amylase and bacteriocin alone or in combination. Preferably all the enzymes are present in the composition. The cofactors comprises of oxidizing agent and inorganic salts of metals. The oxidizing agent is hydrogen peroxide, which is introduced directly or is obtained from its precursors such as perborate or percarbonate or is obtained from an enzyme that converts molecular oxygen and an organic or inorganic substrate into hydrogen peroxide. The inorganic salts of the metal ions are ferrous sulphate heptahydrate and ferric chloride. The nutrients comprise of yeast extract, peptic digest of animal tissue, di-ammonium phosphate sodium chloride, tryptone, soya extract, enzymatic digest of gelatin, magnesium sulphate, calcium chloride, magnesium chloride and potassium sulphate.

The amount of the enzymes present in the composition are 10%-20% v/v of peroxidase (manganese dependent and manganese independent), 7%-10% v/v of lignin peroxidase, 7%-10% v/v of laccase, 1%-5% v/v of catalase, 0.5%-3% v/v of cytochrome c oxidase, 5%-10% v/v of glucose oxidase, 3%-5% v/v of phenol oxidase, 1%-2% v/v of n- and o-demethylase, 5%-7% v/v of protease, 5%-7% v/v of lipase, 5% v/v of alpha-amylase and 1% v/v of bacteriocin. The v/v indicated is volume of the particular enzyme to the total volume of the final product.

The cofactors are present in the range of 5%-30% each of hydrogen peroxide, ferrous sulphate heptahydrate ($Feso_4.7H_2O$) and ferric chloride.

The amount of the nutrient present in the composition is 0.2%-0.5% of yeast extract, 0.3%-0.6% peptic digest of animal tissue, 0.05%-0.2% of di-ammonium phosphate and 0.3%-0.8% of sodium chloride, 0.3%-0.6% of tryptone, 0.2%-0.5% of soya extract, 0.2%-0.5% of enzymatic digest of gelatin, 0.3%-0.8% of magnesium sulphate, 0.3%-0.8% of calcium chloride, 0.3%-0.8% of magnesium chloride and 0.3%-0.8% of potassium sulphate.

According to another embodiment of the invention the process of treatment of waste water comprises the steps of:
 a. adding the microbes, enzymes and cofactors composition along with a mixture of nutrients to the wastewater;
 b. allowing the said composition to react with the wastewater for a predetermined duration of time; and
 c. quantifying the reaction to determine the extent of purification of wastewater.

Chemical oxygen demand (COD) of the wastewater is determined prior to the treatment by open reflux method using potassium dichromate. In this method, a fixed volume with known concentration of potassium dichromate is added to suitably diluted wastewater sample. After a refluxing digestion step with concentrated sulphuric acid the initial concentration of organic substances in the sample is calculated from a titrimetric or spectrophotometric determination of the oxidant still remaining in the sample. A blank sample is created by adding all reagents (e.g. acid and oxidizing agent) to a volume of distilled water. COD is measured for both the water and blank samples, and the two are compared. The oxygen demand in the blank sample is subtracted from the COD for the original sample to ensure a true measurement of organic matter.

The composition and the process parameters have been described in the other embodiment of the invention.

Figure 1:
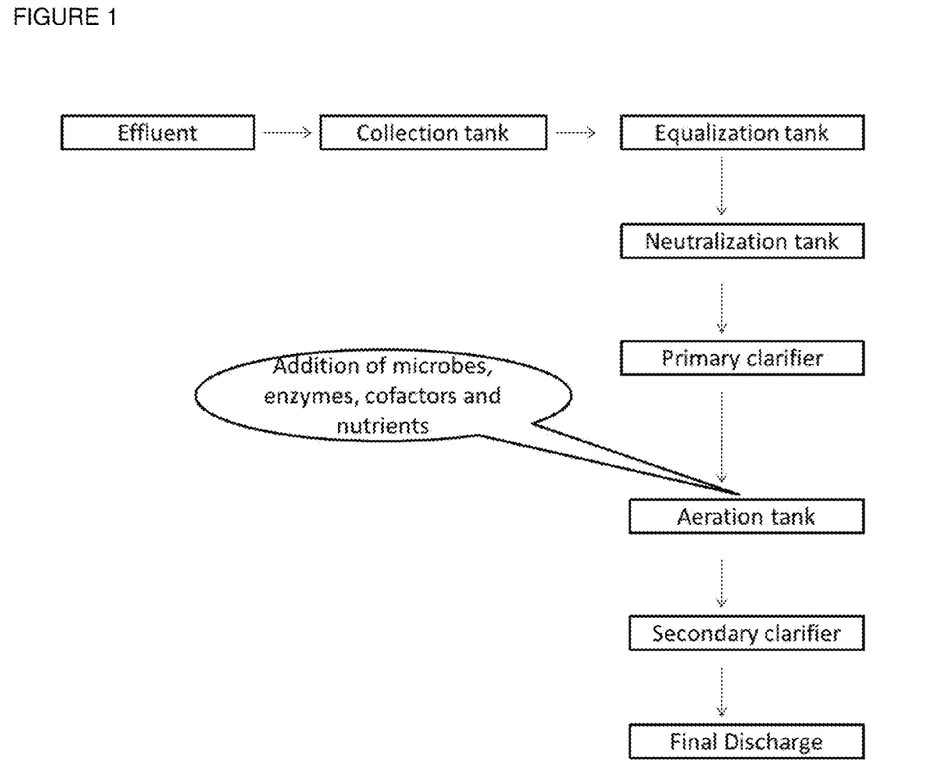
FIG. 1 shows a flow chart of different stages in the wastewater treatment process.

FIG. 1 shows a flow chart of different stages in wastewater treatment process. The process includes the step of first discharge of the wastewater, hereinafter referred to as sample, into a collection tank and then equalization tank. At this stage screenings and grit removal are used to separate the sand and other inorganic material that can be harmful to pumps and other equipment in the treatment processes. The sample then enters the neutralization tank where pH is adjusted to neutral (6.5-7.5) using concentrated acid or alkali. The neutralized sample enters the primary clarifier for separation of heavier particulate solid matter from water which enters the aeration tank or biological oxidation tank commonly referred to as BIOT.

At the BIOT, organic and inorganic components of the clarified sample are broken down to simpler elements by combined action of aeration and microflora of BIOT. At this stage, the composition comprising of microbes, enzymes, cofactors along with nutrients is administered continuously with the inflow of wastewater into the tank. Wastewater is retained in this tank for a predetermined duration. The duration retention of the wastewater in the tank is determined based upon the tank size and flow rate of the wastewater into the tank. Subsequent to the treatment of the wastewater by the composition, the treated wastewater is then sent to the secondary clarifier where settling of suspended matter and microbial biomass occurs to form sludge. The clear water obtained at this stage is later sent for further processing as per requirement.

Method of Obtaining Co-Culture of Different Strains of Microbes:

Individual microbial strains are cultivated separately in pure culture till the logarithmic phase of growth. 10% (v/v) of each pure culture is then taken for preparation of co-culture comprising of all of the above mentioned microbial strains. The co-culture thus prepared is further incubated for a minimum time period of 8-14 h to achieve maximum growth of all the strains for preparation of final formulation. In an embodiment of the invention, 10% v/v (volume of culture of the particular strain to the total volume of co-culture) of pure culture of each strain, in the log phase of their growth cycle, is selected.

Preparation of composition comprising of microbes, enzymes and cofactors along with the nutrients for administering into the wastewater for treatment: Individual microbial strains are cultivated separately in the nutrients in pure culture till the logarithmic phase of growth. 10% (v/v) of each pure culture is then taken for preparation of co-culture comprising of all of the above mentioned microbial strains. The co-culture thus prepared is further incubated for a minimum time period of 8-14 h to achieve maximum growth of all the strains for preparation of final formulation. To the co-culture of the microbial strain taken in the range of 40% to 60% volume/volume, enzymes in the range 60% to 40% volume/volume is added. Cofactors in the range of 5%-30% are added along with the combination of enzymes microbes and nutrients.

The process facilitated by enzymes, microbes and cofactors enables conversion of recalcitrant compounds occurring in industrial wastewater to simpler, easily disposable intermediates and end products, thereby decreasing colour and COD and improving quality of water for use. Continuous addition of the composition ensures an active supply of flora for treatment and hence no need for reactivating the treated wastewater. Addition of enzymes allows rapid degradation of complex compounds into simpler molecules for easy uptake of the same by the microbes. The time required for degradation of pollutants in wastewater is reduced. Ability to integrate the step of addition of the enzymes-microbes combination at any step during the treatment of wastewater is possible by means of this process. The process enables to handle any type of wastewater with the same combination of enzymes, microbes and cofactors along with the nutrients.

The invention has great commercial applications in textile plants, pulp and paper manufacturing units, oil refineries, petrochemical plants, tanneries, pharmaceuticals, chemical manufacturing, fermentation plants, food processing plants and any other unit discharging recalcitrant compounds in wastewater.

A consistent reduction in various parameters measured in the wastewater released from the textile, paper and pulp processing unit after the treatment of the effluent with the composition is evident after allowing a reaction time of 16 hrs. Some of the measured parameters are shown for illustration purpose. The first parameter shown is color estimation using standard platinum-cobalt method (PC-units) showing reduction in color of the wastewater. Second parameter considered is total dissolved solid (in ppm) showing significant decrease in TDS. Total dissolved solids are estimated using a TDS meter based on conductivity. The third parameter analyzed is chemical oxygen demand showing significant decrease in chemical oxygen demand (in ppm) of the wastewater. COD is estimated by open reflux method. Odor is estimated by organoleptic methods based on human olfactory sensations.

Various parameters to prove the effectiveness of the process has been estimated. The results prove that the pollutants in the wastewater can be effectively controlled by the synergistic composition and by the process described.

The source and geographical origin of the microbes are:

| Microbes | Source | Geographical origin |
| --- | --- | --- |
| *Pseudomonas aeruginosa* | Soil | South India |
| *Pseudomonas putida* | Soil | South India |
| *Pseudomonas fluorescence* | Soil | South India |
| *Pseudomonas desmolyticum* | Soil | Western India |
| *Coriolus versicolour* | Soil | Western India |
| *Lactobacillus* sp | Soil | South India |
| *Bacillus subtilis* | Soil | South India |
| *Bacillus cereus* | Soil | South India |
| *Staphylococcus* sp | Soil | South India |
| *Phanerochaete chrysosporium* | Soil | South India |

Figure 2:
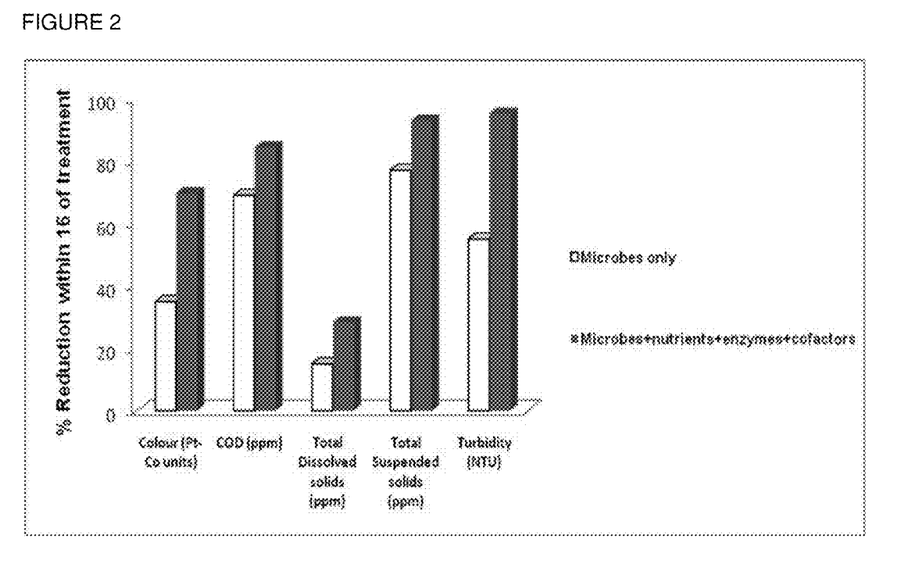
FIG. 2 shows a comparison of reduction in effluent parameters after treatment with microbial strains and combination of microbial strains, nutrients, enzymes and cofactors.

It is to be noted that the microbes are commonly available.
A. FIG. 2 Shows a Comparison of Reduction in Effluent Parameters after Treatment with Microbial Strains and Combination of Microbial Strains, Nutrients, Enzymes and Cofactors in Textile Effluent Sample within 16 h of Treatment.

The effluent treatment is hastened with the combination of microbes and enzymes along with nutrients and cofactors as compared to microbes alone.

B. Reduction in Color (Expressed in Platinum-Cobalt Units) in the Effluent after Treatment with the Synergistic Composition has been Illustrated in FIG. 3.

Figure 3:
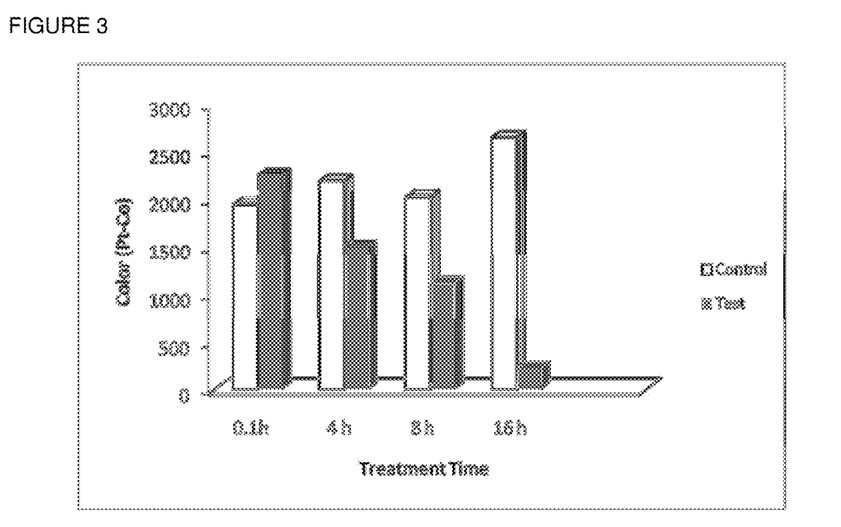
FIG. 3 shows reduction in color (expressed in Platinum-Cobalt units) in the effluent.

The test sample refers to a composition comprising of microbes, enzymes and cofactors along with the nutrients. It can be seen from the figure that after treatment of the wastewater with the synergistic composition, there is a decrease in the color of the wastewater.

C. Reduction in Total Dissolved Solids (TDS) Measured in Parts Per Million (ppm) in the Effluent after Treatment with the Synergistic Composition has been Illustrated in FIG. 4.

Figure 4:
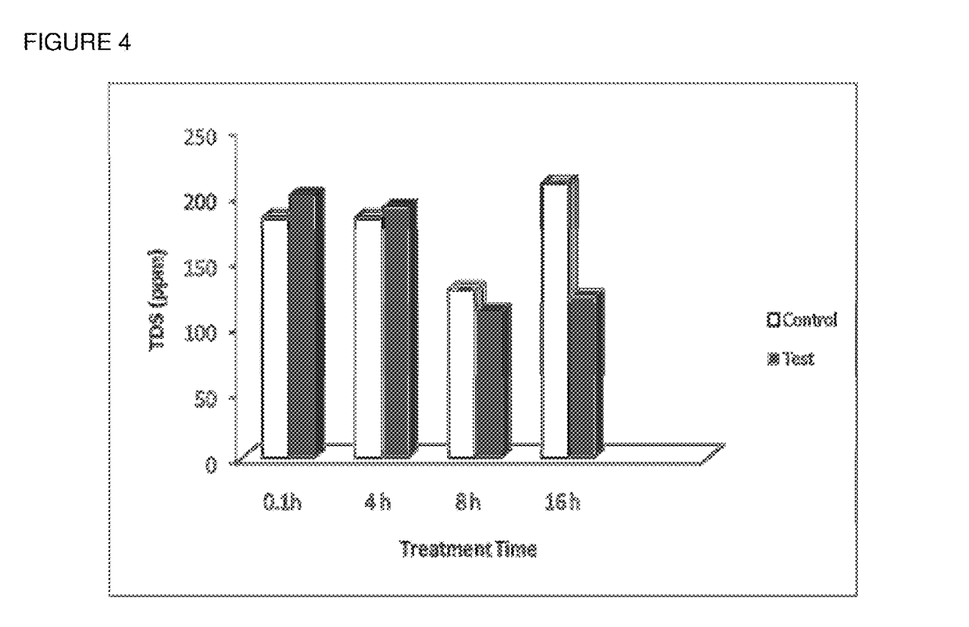
FIG. 4 shows reduction in total dissolved solids (TDS) in the effluent.

The test sample refers to a composition comprising of microbes, enzymes and cofactors along with the nutrients. It can be seen from the figure that after treatment of the wastewater with the synergistic composition, there is a decrease in the total dissolved solids (TDS) present in the wastewater.

D. Reduction in Chemical Oxygen Demand (COD) Measured in Parts Per Million (ppm) in the Effluent after Treatment with the Synergistic Composition has been Illustrated in FIG. 5.

Figure 5:
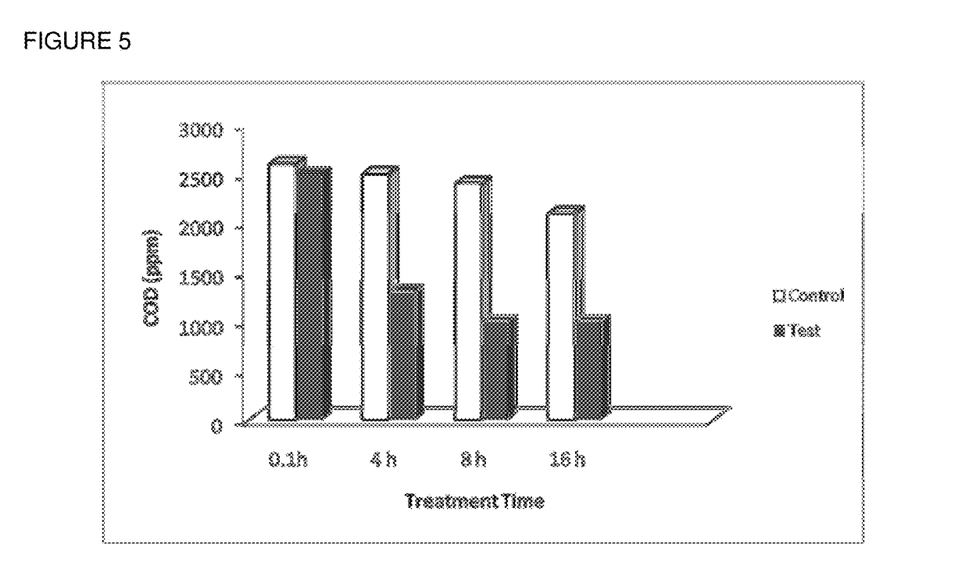
FIG. 5 shows reduction in chemical oxygen demand (COD) measured in parts per million (ppm) of the effluent.

The test sample refers to a composition comprising of microbes, enzymes and cofactors along with the nutrients. It can be seen from the figure that after treatment of the wastewater with the synergistic composition, there is a decrease in the COD.

E. Reduction in Phenol in Industrial Effluent Sample with and without Treatment with the Synergistic Composition The test sample refers to a composition comprising of microbes, enzymes and cofactors along with the nutrients.

| | Phenol estimation | | | | | |
| --- | --- | --- | --- | --- | --- | --- |
| | Set 1 (Control) | | | Set 2 (Test) | | |
| Time (hours) | Peak Area (mAU) | Phenol content (ppm) | % Reduction | Peak Area (mAU) | Phenol content (ppm) | % Reduction |
| 0 | 191.8 | 24 | 0 | 191.8 | 24 | 0 |
| 6 | 191.8 | 24 | 0 | 143.8 | 18 | 25 |
| 12 | 191.8 | 24 | 0 | 81.2 | 10 | 58.3 |
| 24 | 191.4 | 24 | 0 | 29.4 | 3 | 87.5 |

The following examples illustrate the invention, but are not limiting thereof.

Example 1

The experiment was carried out on effluent collected from the inlet of the aeration tank of a textile processing unit in South India. The pH of effluent was adjusted to 6.5 with 0.1 N HCl. For 'test' sample, 0.16 ml of 30% hydrogen peroxide along with 30 mg of ferrous sulphate was added to 200 ml of waste water sample which was kept on magnetic stirrer for 20 minutes to facilitate proper mixing and diffusion used for each individual test. Combination of microbes, enzymes and nutrients was prepared by adding 40% (v/v) of co-culture of microbes as described earlier in nutrients and 60% (v/v) of enzyme blend consisting of the enzymes described earlier. 0.1 ml of this combination was added to the waste water sample and kept on a magnetic stirrer for 20 minutes.

This was followed by incubation of the sample at 30° C. and 50 rpm on an orbital shaker. Control sample consisted of wastewater without the addition of microbes, enzymes, cofactors and nutrients incubated at the conditions mentioned above for the same length of time as 'test'. 5 ml samples were collected from both 'test' as well as 'control' sets at 0.1 h, 4 h, 8 h and 16 h from the start of the experiment. The samples were centrifuged at 5000 rpm for 5 minutes. Color, chemical oxygen demand and total dissolved solids of the supernatant obtained after centrifugation were estimated by standard techniques.

The results of the test and control samples are given below:

| Time | Color (Pt—Co Units) | | Chemical oxygen demand (ppm) | | Total dissolved solids (ppm) | |
|---|---|---|---|---|---|---|
| | Control | Test | Control | Test | Control | Test |
| 0.1 h | 1945 | 2262 | 2600 | 2500 | 183 | 200 |
| 4 h | 2188 | 1500 | 2500 | 1300 | 183 | 191 |
| 8 h | 2026 | 1120 | 2400 | 1000 | 128 | 121 |
| 16 h | 2649 | 229 | 2100 | 1000 | 209 | 123 |

A consistent reduction in various parameters measured in the wastewater released in textile processing unit after enzymatic treatment is evident after allowing a reaction time of 16 hrs.

Example 2

Phenol rich effluent from a petrochemical refinery in India was used for the study. The pH of effluent was adjusted to 6.5 with 0.1 N HCl. For 'test' sample, 0.16 ml of 30% hydrogen peroxide along with 30 mg of ferrous sulphate was added to 200 ml of waste water sample which was kept on magnetic stirrer for 20 minutes to facilitate proper mixing and diffusion used for each individual test. Combination of microbes, enzymes and nutrients was prepared by adding 40% (v/v) of co-culture of microbes in nutrients and 60% (v/v) of enzyme blend consisting of the enzymes described earlier. 0.1 ml of this combination was added to the waste water sample and kept on a magnetic stirrer for 20 minutes. This was followed by incubation of the sample at 30° C. and 50 rpm on an orbital shaker. Control sample consisted of waste water without the addition of microbes, enzymes, cofactors and nutrients incubated at the conditions mentioned above for the same length of time as 'test'. 5 ml samples were collected from both 'test' as well as 'control' sets at 0 h, 6 h, 12 h and 24 h from the start of the experiment. The samples were centrifuges at 5000 rpm for 5 minutes. Phenol content the supernatant obtained after centrifugation was estimated by RP-HPLC on a C18 column with methanol: water 60:40 as mobile and detected by a UV detector at 254 nm.

The results of the test and control samples are given below:

| | Phenol estimation | | | | | |
|---|---|---|---|---|---|---|
| | Set 1 (Control) | | | Set 2 (Test) | | |
| Time (hours) | Peak Area (mAU) | Phenol content (ppm) | % Reduction | Peak Area (mAU) | Phenol content (ppm) | % Reduction |
| 0 | 191.8 | 24 | 0 | 191.8 | 24 | 0 |
| 6 | 191.8 | 24 | 0 | 143.8 | 18 | 25 |
| 12 | 191.8 | 24 | 0 | 81.2 | 10 | 58.3 |
| 24 | 191.4 | 24 | 0 | 29.4 | 3 | 87.5 |

There was significant reduction in phenol content in the test sample whereas no reduction was observed in the control sample indicating the specificity of the treatment method towards aromatic compounds in the effluent, hence its suitability for treatment of discharged waste water from industries.

The invention claimed is:

1. A composition for treatment of wastewater, the composition consisting essentially of a co-culture of logarithmic phase microbes, enzymes, nutrients, and at least one cofactor; wherein the co-culture of logarithmic phase microbes, enzymes, nutrients, and cofactor act synergistically with each other, thereby reducing levels of pollutants in the wastewater;
   wherein the enzymes in the composition consist of at least three enzymes selected from the group consisting of manganese dependent peroxidases, manganese independent peroxidases, lignin peroxidase, laccase, catalase, cytochrome c oxidase, glucose oxidase, phenol oxidase, n- and o-demethylase, protease, lipase, alpha-amylase and bacteriocin, and wherein the at least one cofactor is selected from the group consisting of hydrogen peroxide, ferrous sulphate heptahydrate, and ferric chloride.

2. The composition as claimed in claim 1, wherein the co-culture of logarithmic phase microbes comprises *Pseudomonas aeruginosa, Pseudomonas fluorescence, Pseudomonas putida, Pseudomonas desmolyticum, Coriolus versicolour, Lactobacillus* sp. *Bacillus subtilis, Bacillus cereus, Staphylococcus* sp., and *Phanerochaete chrysosporium*.

3. The composition as claimed in claim 1, wherein the enzymes comprise 10%-20% v/v of the peroxidases (manganese dependent and manganese independent), 7%-10% v/v of the lignin peroxidase, 7%-10% v/v of the laccase, 1%-5% v/v of the catalase, 0.5%-3% v/v of the cytochrome c oxidase, 5%-10% v/v of the glucose oxidase, 3%-5% v/v of the phenol oxidase, 1%-2% v/v of the n- and o-demethylase, 5%-7% v/v of the protease, 5%-7% v/v of the lipase, 5% v/v of the alpha-amylase and 1% v/v of the bacteriocin, wherein v/v is volume relative to the total volume of the composition.

4. The composition as claimed in claim 1, wherein the nutrients comprise yeast extract, peptic digest of animal tissue, diammonium phosphate and sodium chloride, tryptone, soya extract, enzymatic digest of gelatin, magnesium sulphate, calcium chloride, magnesium chloride and potassium sulphate.

5. The composition as claimed in claim 4, wherein the nutrients comprise 0.2%-0.5% of the yeast extract, 0.3%-0.6% of the peptic digest of animal tissue, 0.05%-0.2% of the di-ammonium phosphate and 0.3%-0.8% of the sodium chloride, 0.3%-0.6% of the tryptone, 0.2%-0.5% of the soya extract, 0.2%-0.5% of the enzymatic digest of gelatin, 0.3%-0.8% of the magnesium sulphate, 0.3%-0.8% of the calcium chloride, 0.3%-0.8% of the magnesium chloride and 0.3%-0.8% of the potassium sulphate.

6. A process for treating wastewater, the process comprising:

adding a composition consisting essentially of a combination of a co-culture of logarithmic phase microbes, enzymes, at least one cofactor, and nutrients to the wastewater, wherein the enzymes in the composition consist of at least three enzymes selected from the group consisting of manganese dependent peroxidases, manganese independent peroxidases, lignin peroxidase, laccase, catalase, cytochrome c oxidase, glucose oxidase, phenol oxidase, n- and o-demethylase, protease, lipase, alpha-amylase and bacteriocin, and wherein the at least one cofactor is selected from the group consisting of hydrogen peroxide, ferrous sulphate heptahydrate, and ferric chloride;

allowing said composition to react with the wastewater in a reaction for a predetermined duration of time; and quantifying the reaction to determine the extent of purification of the wastewater, wherein the combination of the co-culture of logarithmic phase microbes, enzymes, nutrients and cofactor synergistically reduces levels of pollutants in the wastewater.

7. The process as claimed in claim 6, wherein the co-culture of logarithmic phase microbes comprises *Pseudomonas aeruginosa, Pseudomonas fluorescence, Pseudomonas putida, Pseudomonas desmolyticum, Coriolus versicolour, Lactobacillus* sp. *Bacillus subtilis, Bacillus cereus, Staphylococcus* sp., and *Phanerochaete chrysosporium*.

8. The process as claimed in claim 6, wherein the nutrients comprise yeast extract, peptic digest of animal tissue, diammonium phosphate and sodium chloride, tryptone, soya extract, enzymatic digest of gelatin, magnesium sulphate, calcium chloride, magnesium chloride and potassium sulphate.

* * * * *